(12) United States Patent
Percec et al.

(10) Patent No.: US 7,025,918 B1
(45) Date of Patent: Apr. 11, 2006

(54) MULTILAYER STRUCTURES

(75) Inventors: Elena Simona Percec, Chagrin Falls, OH (US); Richard J. Jorkasky, Hudson, OH (US); George S. Li, Solon, OH (US)

(73) Assignee: Institute of Textile Technology, Raleigh, NC (US)

( * ) Notice: Subject to any disclaimer, the term of this patent is extended or adjusted under 35 U.S.C. 154(b) by 600 days.

(21) Appl. No.: 09/607,002

(22) Filed: Jun. 29, 2000

Related U.S. Application Data

(62) Division of application No. 08/989,807, filed on Dec. 12, 1997, now abandoned.

(51) Int. Cl.
 *B32B 25/00* (2006.01)
 *B29C 45/00* (2006.01)
 *B29C 47/06* (2006.01)
 *B29D 9/00* (2006.01)

(52) U.S. Cl. .......................... 264/173.12; 264/173.16; 264/173.17; 264/174.11; 264/510; 264/513; 264/514

(58) Field of Classification Search ............... 428/35.7, 428/36.6, 36.7, 36.91, 522; 264/513, 514, 264/515, 176.1, 209.1, 173.12, 173.16, 173.17, 264/174.11, 510
See application file for complete search history.

(56) References Cited

U.S. PATENT DOCUMENTS 4,777,077 A * 10/1988 Miyazawa et al. .......... 264/299
5,462,794 A * 10/1995 Lindemann et al. ..... 428/317.1

FOREIGN PATENT DOCUMENTS

JP 60009739 * 1/1985

* cited by examiner

*Primary Examiner*—Rena L. Dye
(74) *Attorney, Agent, or Firm*—McGuire Woods LLP

(57) ABSTRACT

A novel multilayer structure in which one layer comprises a polymer comprising a solventless, waterless, melt-processable acrylonitrile olefinically unsaturated polymer and the other layer comprises an organic polymer. Either polymer can be employed as the inner layer or the outer layer component of the multilayer structure.

7 Claims, 4 Drawing Sheets

MULTILAYER STRUCTURES

This application is a divisional application of application Ser. No. 08/989,807, filed on Dec. 12, 1997, now abandoned.

BACKGROUND OF THE INVENTION

The present invention relates to multilayer structures and methods for their preparation. More particularly, the invention relates to a multilayer structure having typical organic polymer layer(s) and dissimilar organic polymer layer(s) comprising a solventless waterless melt-processable acrylonitrile olefinically unsaturated polymer. It is understood that the term multilayer structure includes film, tape, sheets, containers, composites, articles that are extruded, injection molded, compression molded or the like, structural body, and the like throughout this specification.

No single polymer is capable of providing the chemical and physical properties that are required for various applications. It is useful to manufacture films, sheets, containers and packages from multilayer polymer materials because different polymer compositions provide different properties, and by combining different polymer layers the final product will have the benefit of the different polymer properties. Unfortunately, polymers that provide one kind of properties do not readily combine or adhere to polymers that provide other unique chemical and physical properties.

Therefore, it would be advantageous to produce a multilayer material using dissimilar polymer layers. The present invention produces such a multilayer material. It would be further advantageous to produce a multilayer structure with an acrylonitrile olefinically unsaturated polymer. An acrylonitrile olefinically unsaturated polymer can be characterized by high resistance to abrasion, solvents, gas and UV light, hardness and high puncture resistance but lower water vapor resistance rate in comparison to other polymers such as polyolefins. An organic polymer can be characterized by high water vapor resistance rate, high tear strength, good heat seal and reduced shrink properties and low density, but has poor gas and solvent barrier properties and low UV resistance. The unique nitrile and organic polymer multilayer structure of the present invention provides improved gas/water barrier properties, resistance to chemicals, abrasion, solvents, and UV light, improved rigidity, weatherability, wear performance and impact strength. These and other advantages will become apparent as the description of the invention proceeds.

SUMMARY OF THE INVENTION

The present invention is directed to a multilayer structure which displays improved resistance to abrasion, organic solvents, water vapor, gas (i.e., oxygen, carbon dioxide barrier properties), and UV light, as well as improved rigidity, impact strength, and wear performance. The multilayer structure comprises an organic polymer layer; and a solventless, waterless, melt processable acrylonitrile olefinically unsaturated polymer layer which comprises about 50% to about 95% by weight polymerizable acrylonitrile monomer and at least one of about 5% to about 50% by weight polymerizable olefinically unsaturated monomer.

The present invention also provides a method for preparation of the multilayer structure which comprises the steps of providing an organic polymer; providing a solventless, waterless, melt-processable acrylonitrile olefinically unsaturated polymer comprising about 50% to about 95% by weight polymerizable acrylonitrile monomer and at least one of about 5% to about 50% by weight polymerizable olefinically unsaturated monomer; and melt processing the polymeric components. The present invention may be used in a variety of molding methods, including extrusion, co-injection molding, multilayer extrusion molding, multilayer blow molding, injection molding, compression molding and the like.

DETAILED DESCRIPTION OF THE INVENTION

In accordance with the present invention, the multilayer structure comprises an organic polymer layer and a waterless, solventless melt-processable acrylonitrile olefinically unsaturated polymer (hereinafter "acrylonitrile olefinically unsaturated polymer") layer. The multilayer structure comprises at least two layers.

The layer of organic polymer includes, but is not limited to, synthetic and natural polymers. The synthetic polymer includes, but is not limited to, polyolefins such as polypropylene, polyethylene and poly(4-methylpentene-1); polyesters such as polyethylene terephthalate (PET), polybutylene terephthalate (PBT), and polyethylene naphthalate (PEN); polyamides (PA), including aliphatics and aromatics, such as nylons; polycarbonates such as polybisphenol-A carbonate (PC); polyimides (PI) such as polyetherimide aliphatic and aromatic; poly(amide-imides); poly(ester-imides); polystyrenes (PS); polyurethanes; polyvinyl chloride (PVC); polyketones; polyphenylene oxide (PPO); polyvinyl alcohol (PVA); polysulphone; liquid crystalline polymers such as copolyesters of hydroxy-benzoic acid with 2,6 naphthoic acid (Vectra); Kevlar® (available from DuPont); acrylonitrile containing polymers including a waterless, solventless melt processable acrylonitrile olefinically unsaturated polymer or an acrylonitrile containing polymer that is soluble in a solvent; and the like.

The monomers employed in the organic polymer can be one monomer or a combination of monomers dependent upon the properties desired to impart to the end use of the multilayer structure. In a multilayer structure of three layers or more, the organic polymer is employed as either the outer layer or the inner layer of the structure, but not both.

The other polymer layer is an acrylonitrile olefinically unsaturated polymer comprising an acrylonitrile monomer polymerized with at least one olefinically unsaturated monomer. The acrylonitrile olefinically unsaturated polymer comprises about 50% to about 95% by weight, preferably about 75% to about 93% by weight, and most preferably about 85% to about 92% by weight of polymerized acrylonitrile monomer, and at least one of about 5% to about 50% by weight, preferably about 7% to about 25% by weight, and most preferably about 8% to about 15% by weight of polymerized olefinically unsaturated monomer. The acrylonitrile olefinically unsaturated polymer is employed as the outer layer or the inner layer or both.

The olefinically unsaturated monomer employed is one of more of an olefinically unsaturated monomer with a C=C double bond polymerizable with an acrylonitrile monomer. The olefinically unsaturated monomer can be a single polymerizable monomer resulting in a co-polymer, or a combination of polymerizable monomers resulting in a multipolymer. The choice of olefinically unsaturated monomer or a combination of monomers depends upon the properties desired to impart to the resulting multilayer structure and its end use.

The olefinically unsaturated monomer generally includes, but is not limited to, acrylates such as methyl acrylates and ethyl acrylates; methacrylates, such as methyl methacrylate; acrylamides and methacrylamides and each of their N-substituted alkyl and aryl derivatives, such as acrylamide, methacrylamide, N-methylacrylamide, N,N-dimethyl acrylamide; maleic acid and its derivatives, such as N-phenylmaleimide; vinylesters, such as vinyl acetate; vinylethers, such as ethyl vinyl ether and butyl vinyl ether; vinylamides, such as vinyl pyrrolidone; vinylketones, such ethyl vinyl ketone and butyl vinyl ketone; styrenes, such as methylstyrene, stryene and indene; halogen containing monomers, such as vinyl chloride, vinyl bromide, and vinylidene chloride; ionic monomers, such sodium vinylsulfonate, sodium styrenesulfonate, and sodium methyl sulfonate; acid containing monomers such as itaconic acid, styrene sulfonic acid and vinyl sulfonic acid; base-containing monomers, such as vinyl pyridine, 2-aminoethyl-N-acrylamide, 3-aminopropyl-N-acrylamide, 2-aminoethylacrylate, 2-aminoethymethacrylate; and olefins, such as propylene, ethylene, isobutylene.

The multilayer structure is a minimum of two layers, or an unlimited number of layers, depending on the end use application. For example, a three-layer structure employs an inner layer of either the organic polymer or the acrylonitrile olefinically unsaturated polymer with the inner layer sandwiched therebetween the outer layers which is the organic polymer or the acrylonitrile olefinically unsaturated polymer, depending on the desired end use of the product.

The polymer employed as the inner layer has a dissimilar composition or a dissimilar molecular weight or dissimilar rheological properties in comparison to the polymer employed as the outer layer. The organic polymer and the acrylonitrile olefinically unsaturated polymer are thermally stable in relationship to each other. The organic polymer or the acrylonitrile olefinically unsaturated polymer is either the inner layer or the outer layer of the multilayer structure depending on the end use application and on the chemical and physical properties of the polymers such as melt flow and thermal characteristics, molecular weight, composition and the like. In the invention, the polymer employed as the inner layer of the multilayer structure is in the range of about 1% weight to about 99% weight, preferably about 5% weight to about 95% weight and more preferable about 10% weight to about 90% weight of the multilayer structure. The polymer employed as the outer layer in the multilayer structure is in the range of about 99% weight to about 1% weight, preferably about 95% weight to about 5% weight and more preferable about 90% weight to about 10% weight of the multilayer. The minimum amount of polymer for a layer is such that the polymer of the adjacent layer is not excessively exposed on the surface.

The composition of the polymer used for the outer layer and the composition of the polymer used for the inner layer are prepared separately. The acrylonitrile olefinically unsaturated polymer is prepared by known polymerization processes. An exemplary method to make the melt-processable high-nitrile multi-polymer is described in U.S. Pat. No. 5,602,222 "A Process for Making a Polymer of Acrylonitrile/Methacrylonitrile/Olefinically Unsaturated Monomers" and U.S. Pat. No. 5,618,901 entitled "A Process for Making a High Nitrile Multipolymer Prepared from Acrylonitrile and Olefinically Unsaturated Monomers," both incorporated herein by reference. The organic polymer is prepared by known polymerization processes.

The multilayer structure is produced by a melt process. The thickness of the layers depend on the desired end use and is in the range of about 1 micron to any thickness depending on the end use application. The melt processing temperature is dependent on the melt temperature and the thermal degradation temperature of the composition of the outer layer polymer and the inner layer polymer.

The acrylonitrile olefinically unsaturated polymer is melt processed in a waterless, solventless system; however trace amounts of water as an impurity may exist up to 3%, preferably 1% or less. A process for producing the multilayer structure of this invention comprises preparing separately the organic polymer and the acrylonitrile olefinically unsaturated polymer; combining the components; and extruding the polymer components through conventional means.

In a one-step injection molding process, the various melt polymer components are combined in a mold and the mold allowed to cool.

In a one-step extrusion process, the various melt polymer components are coextruded in a conventional manner.

Additional treatment may be employed to further modify the characteristics of the multilayer structure by the addition of reinforcement materials such as carbon fibers, glass fibers and the like; additives; delustering agents; coloring agents and the like. It is understood that any additive possessing the ability to function in such a manner can be used so long as it does not have a deleterious effect on the properties of the nitrile multilayer structure. The invention is not limited to any specific lamination, extrusion, injection or molding techniques.

These multilayer structures are used for packaging applications, subsequent fabricated articles prepared from sheet precursors. In particular, the multilayer structures are used as films, packaging films, tapes, sheets, pipes, packages, trays, bottles, containers, composites, fabricated articles, structural bodies and the like. Further, the multilayer structure is employed in packaging applications, including automotive fuel tanks, as well as containers including those that can go from hot filling to freezer to microwave, building materials, pipes and the like.

SPECIFIC EMBODIMENT

The following examples demonstrate the advantages of the present invention.

The polymers used were: 1) acrylonitrile olefinically unsaturated polymer crumb employing 85% acrylonitrile monomer polymerized with 15% methyl acrylate polymer; and 2) an organic polymer of polypropylene pellets (melt index=18) with an 18 melt flow index or polyethylene polymer pellets with high density and a 1 melt flow index.

The acrylonitrile methyl acrylate polymer and polyolefin of either polypropylene or polyethylene were mixed together in a one gallon pail. The mixture was extruded using a three zone, 0.75 inch extruder fitted with a film (tape) die. The mixture of polymer resin was added to a hopper and extruded at about 35 rpm. The material coming out of the die was taken up on a film (tape) machine comprising two rollers. The rollers could optionally be heated. The rollers were compressed to regulate the thickness of the film (tape) and the speed of the rollers was adjusted to regulate the thickness and width of the film (tape). The resulting multilayer structure was three layers in a sandwich configuration. The following Table I describes the ratios of each polymer and condition employed. PP stands for polypropylene; PE stands for polyethylene; and AMLON™ stands for acrylonitrile olefinically unsaturated polymer employing 85% acrylonitrile copolymerized with 15% methyl acrylate.

TABLE I

| Ratio | ExtruderTemps | Film Roll Speed |
|---|---|---|
| 100 PP (comparison) | 215/215/215/215 C. | 7.0 |
| 100 AMLON ™ (comparison) | 215/215/215/215 C. | 7.0 |
| 80 PP/20 AMLON ™ | 215/215/215/215 C. | 7.0 |
| 70 PP/30 AMLON ™ | 215/215/215/215 C. | 5.5 |
| 50 PP/50 AMLON ™ | 225/225/225/225 C. | 6.0 |
| 20 PP/80 AMLON ™ | 235/235/235/235 C. | 3.0 |
| 50 PP/50 AMLON ™ | 200/200/200/200 C. | — |
| 80 PE/20 AMLON ™ | 215/215/215/215 C. | 4.0 |

The composite tapes were examined by optical microscopy using a Leitz cross polarizing optical microscope (Laborlux 12 pol) equipped with a Mettler hot stage. It was determined by optical microscopy that the tape had a multilayer configuration.

FIG. 1 demonstrates that the acrylonitrile methyl acrylate/polypropylene laminar morphologies are obtained from a large range of different ratios of polymer.

Figure 1A:
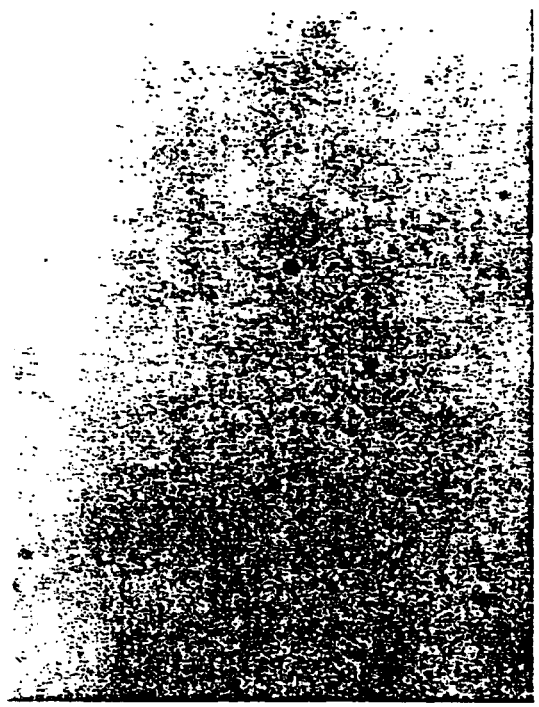
FIG. 1(a) shows the morphology of an acrylonitrile methyl acrylate extruded tape which is used for a comparison.
Figure 1B:
FIG. 1(b) shows the morphology of an acrylonitrile methyl acrylate/polypropylene 80/20 extruded tape.
Figure 1C:
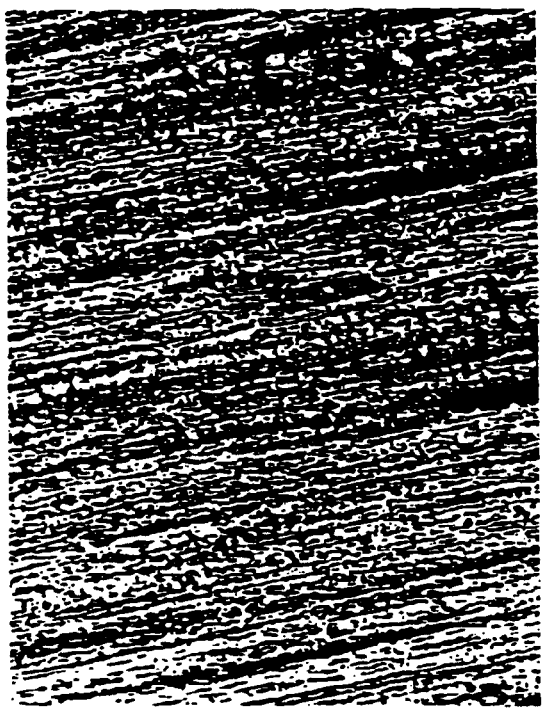
FIG. 1(c) shows the morphology of an acrylonitrile methyl acrylate/polypropylene 50/50 extruded tape.
Figure 1D:
FIG. 1(d) shows the morphology of an acrylonitrile methyl acrylate/polypropylene 20/80 extruded tape.
Figure 2A:

FIG. 2(a) shows the morphology of an acrylonitrile methyl acrylate extruded tape which is used for comparison.

Figure 2B:
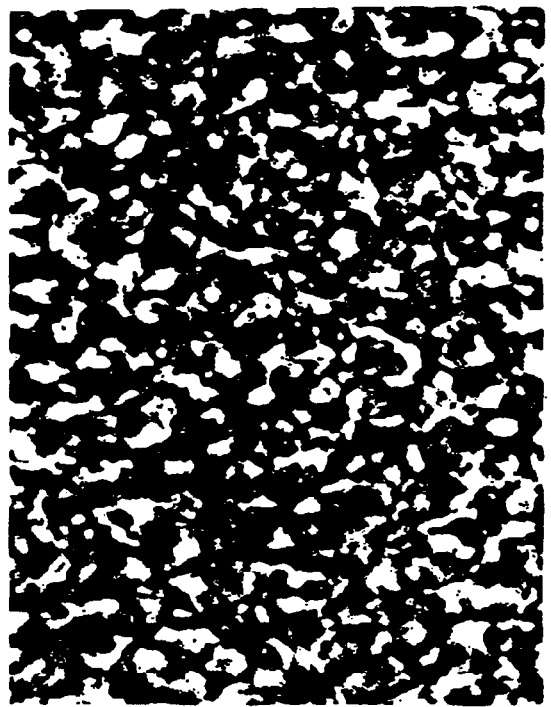

FIG. 2(b) shows the morphology of a polypropylene extruded tape which is used for comparison.

Figure 2C:

FIG. 2(c) shows the morphology of an acrylonitrile methyl acrylate/polypropylene 30/70 extruded tape.

Figure 2D:

FIG. 2(d) shows the morphology of an acrylonitrile methyl acrylate/polypropylene 20/80 extruded tape.

FIG. 2 demonstrates that the extruded tapes were in a sandwich configuration with the polypropylene as the inside layer and the acrylonitrile methyl acrylate as the outside layers. This is demonstrated by the pictures which show in FIG. 2(a) that the acrylonitrile methyl acrylate has crystallites too small in size to be distinguished by optical microscopy in comparison to FIG. 2(b) polypropylene which exhibits a distinct crystalline pattern. This crystalline structure is not observed for FIGS. 2(c) and (d) which indicates that the acrylonitrile methyl acrylate is present as both outside layers, while the polypropylene forms the inside layer.

Figure 3A:
Figure 3B:

FIGS. 3(a) and (b) show the morphology of an acrylonitrile methyl acrylate/polypropylene 50/50 extruded tape.

Figure 3C:
Figure 3D:

FIGS. 3(c) and (d) show the same tape after extraction with DMF (dimethylformamide) for about 40 hours at room temperature. FIG. 3 demonstrates that before extraction the morphology of the 50/50 acrylonitrile methyl acrylate/polypropylene extruded tape is laminar, with acrylonitrile methyl acrylate present as the outside layers. After extraction with the DMF, the acrylonitrile methyl acrylate layer is removed, and the polypropylene crystalline pattern is readily observed.

Figure 4A:
Figure 4B:
Figure 4C:
Figure 4D:

FIGS. 4(a) and (b) show the morphology of an acrylonitrile methyl acrylate/polyethylene 20/80 extruded tape and FIGS. 4(c) and (d) show the same tape after extraction with DMF for about 40 hours at room temperature. FIG. 4 indicates that the laminar morphology is also characteristic for acrylonitrile methyl acrylate/polyethylene combinations. It also demonstrates that in this case the polyethylene is present as the outside layers, because after the DMF extraction, the morphology of the extruded tape remains unchanged.

From the above description and examples of the invention, those skilled in the art will perceive improvements, changes, and modifications in the invention. Such improvements, changes and modifications within those skilled in the art are intended to be covered by the appended claims.

What is claimed is:

1. A process for producing a nitrile structure having at least two layers, comprising the steps of:
   providing an organic polymer;
   providing an acrylonitrile olefinically unsaturated polymer;
   mixing the organic polymer and acrylonitrile olefinically unsaturated polymer together to form a mixture of organic polymer and acrylonitrile olefinically unsaturated polymer; and
   extruding the mixture through a single die opening, wherein the extruded mixture arranges to produce a nitrile structure having an organic polymer layer and an acrylonitrile olefinically unsaturated polymer layer.

2. The process of claim 1, wherein the acrylonitrile olefinically unsaturated polymer comprises about 50% to about 95% by weight polymerizable acrylonitrile monomer and at least one of about 5% to about 50% by weight polymerizable olefinically unsaturated monomer.

3. The process of claim 1, wherein the organic polymer component and the acrylonitrile olefinically unsaturated polymer component are thermally stable in relationship to each other.

4. A process to produce a nitrile structure having at least two layers, comprising the steps of:
   providing an organic polymer;
   providing an acrylonitrile olefinically unsaturated polymer;
   mixing the organic polymer and acrylonitrile olefinically unsaturated polymer together to form a mixture of organic polymer and acrylonitrile olefinically unsaturated polymer; and
   molding the mixture through a single die opening in a mold, wherein upon molding the mixture arranges to produce a nitrile structure having an organic polymer layer and an acrylonitrile olefinically unsaturated polymer layer.

5. The process of claim 4, wherein the step of molding is injection molding.

6. The process of claim 4, wherein the acrylonitrile olefinically unsaturated polymer comprises about 50% to about 95% by weight polymerizable acrylonitrile monomer and at least one of about 5% to about 50% by weight polymerizable olefinically unsaturated monomer.

7. The process of claim 4, wherein the organic polymer component and the acrylonitrile olefinically unsaturated polymer component are thermally stable in relationship to each other.

* * * * *